United States Patent [19]

Skoglund

[11] Patent Number: 5,301,713
[45] Date of Patent: Apr. 12, 1994

[54] FLOW CONTROL VALVE HAVING ADJUSTABLE PISTON FOR VARYING FLOW RATE

[76] Inventor: Paul K. Skoglund, P.O. Box 848, Woodinville, Wash. 98072

[21] Appl. No.: 69,459

[22] Filed: Jun. 1, 1993

[51] Int. Cl.$^5$ .............................................. G05D 7/01
[52] U.S. Cl. ..................................................... 137/504
[58] Field of Search .............................. 137/501, 504

[56] References Cited

U.S. PATENT DOCUMENTS

| | | |
|---|---|---|
| 824,425 | 6/1906 | Johnson . |
| 2,093,015 | 9/1937 | Madden . |
| 2,121,936 | 6/1938 | Thomas . |
| 2,351,035 | 6/1944 | Grant ............................. 137/504 X |
| 2,655,935 | 10/1953 | Kinzbach . |
| 2,699,799 | 1/1955 | Wager . |
| 2,704,553 | 3/1955 | Verteuil ......................... 137/504 X |
| 2,865,397 | 12/1958 | Chenault . |
| 3,122,162 | 2/1964 | Sands . |
| 3,433,262 | 3/1969 | Ray . |
| 3,446,227 | 5/1969 | Grayson . |
| 3,478,776 | 11/1969 | Royer . |
| 3,503,417 | 3/1970 | Toda . |
| 3,593,742 | 7/1971 | Taylor . |
| 3,729,018 | 4/1973 | Butterfield . |
| 3,741,242 | 6/1973 | Hansen et al. . |
| 3,872,884 | 3/1975 | Busdiecker . |
| 3,958,596 | 5/1976 | Garrard ............................. 137/504 |
| 4,016,905 | 4/1977 | Marlatt, Sr. . |
| 4,074,693 | 2/1978 | Kates . |
| 4,080,993 | 3/1978 | Lind . |
| 4,092,998 | 6/1978 | Taplin . |
| 4,098,285 | 7/1978 | Karing . |
| 4,168,719 | 9/1979 | Renshaw . |
| 4,175,584 | 11/1979 | Rikuta . |
| 4,230,147 | 10/1980 | Booth et al. . |
| 4,250,914 | 2/1981 | Ferrentino . |
| 4,508,140 | 4/1985 | Harrison . |
| 4,541,454 | 9/1985 | Sturman et al. . |
| 4,893,649 | 1/1990 | Skoglund ............................. 137/504 |
| 5,004,008 | 4/1991 | Drucker . |
| 5,022,438 | 6/1991 | Faraon-Chaul . |
| 5,054,516 | 10/1991 | Okerblom . |
| 5,143,116 | 9/1992 | Skoglund . |

FOREIGN PATENT DOCUMENTS

| | | |
|---|---|---|
| 4449506 | 3/1963 | Japan ..................................... 137/504 |
| 77/2626 | 2/1978 | South Africa . |

OTHER PUBLICATIONS

"A Novel Approach to Flow Control for Chemical Injection and Continuous Sampling", M. S. Shelton, Society of Petroleum Engineers Publication No. 16910, pp. 329–338, Sep., 1987.
"Automatic Flow Rate Controllers", Kates Company, a Taub Company. (undated).
"Primary Secondary Pumping Manual", ITT. (undated).
"Variable Speed/Variable Volume Pumping Fundamentals", ITT (undated).
"A Chilling Story of the Bridge", BRDG-TNDR Corp. (undated).
"Design ED, EAD and EDR Control Valve Bodies", Fisher Corp (undated).
"Flow Control", Westinghouse (undated).
"Air Handling Unit-Coil Piping 3-Way Valve Control"(undated).
"Specification Sheet No. 428DP-CP", Bailey (undated).
"Two-Way Valve Cast Iron Flanged", Sauter (undated).

*Primary Examiner*—Robert G. Nilson
*Attorney, Agent, or Firm*—Graybeal Jackson Haley & Johnson

[57] ABSTRACT

A constant flow rate controller valve includes a piston spring biased towards the top of the valve. Fluid flowing into the valve increases the forces in the chamber above the piston, forcing the piston toward a valve seat. The piston is thus seated in the valve seat, blocking fluid flow to the outlet port. The forces on the piston in the chamber below the piston builds as flow goes through the piston until the forces in this chamber including the piston spring force is greater than the forces in the chamber above the piston. The piston then is lifted from the valve seat, and the pathway to the outlet orifice is opened. Fluid flows through the piston via the calibrated orifice. An equilibrium flow rate is reached by variation in the piston position based on the location of the movable seat which sets and maintains a constant differential pressure.

17 Claims, 1 Drawing Sheet

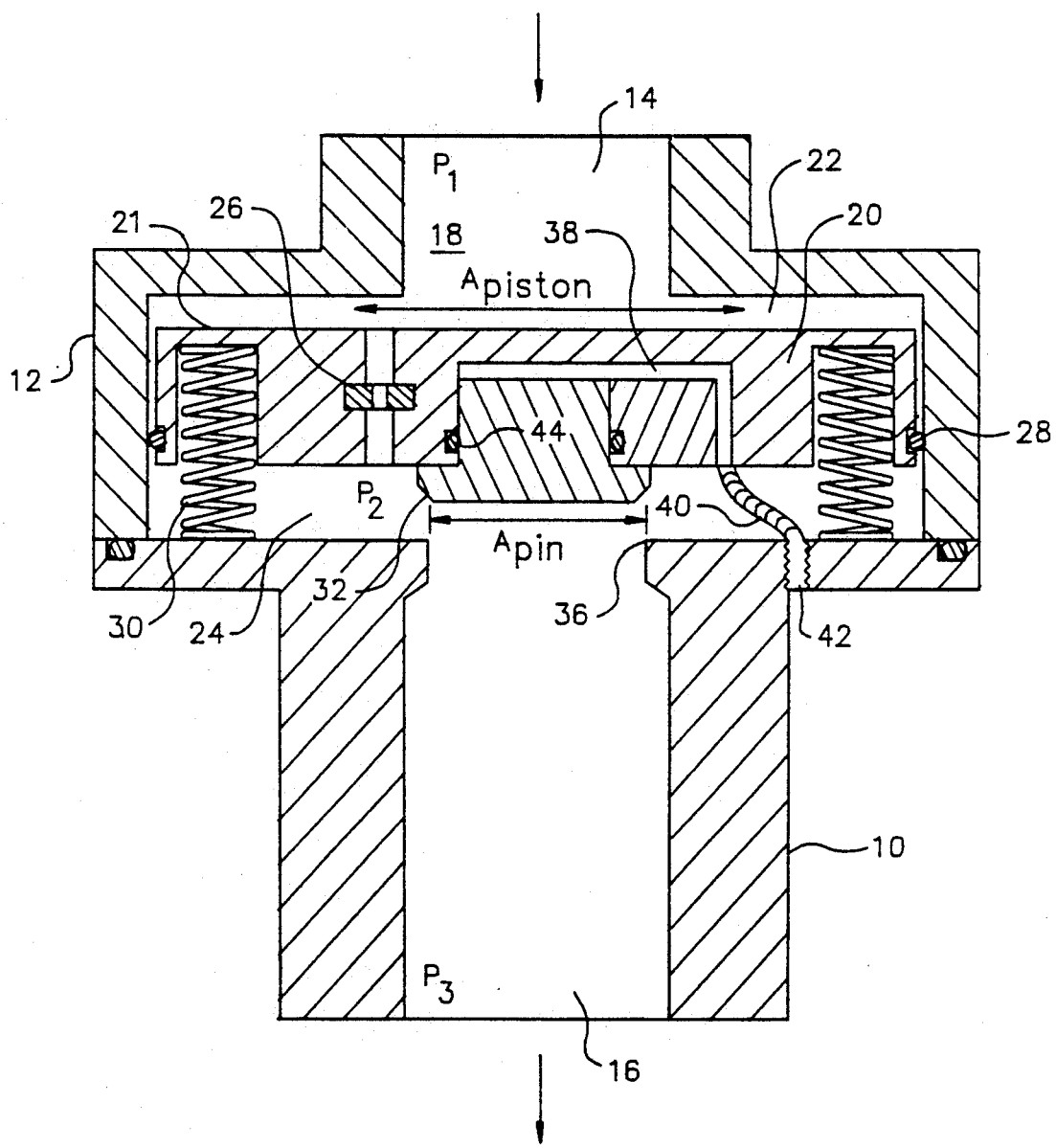

FLOW CONTROL VALVE HAVING ADJUSTABLE PISTON FOR VARYING FLOW RATE

BACKGROUND OF THE INVENTION

The present invention relates to constant fluid flow regulators and more particularly to a flow regulator having a spring biased piston and being capable of maintaining a constant fluid flow rate in both high pressure, low volume and low pressure, high volume environments with changes in inlet or outlet pressure. The present invention also accommodates high pressure, high volume and low pressure, low volume systems.

Constant fluid flow regulators capable of accommodating low pressure, high volume fluid flow often employ sliding sleeves for opening and closing parts of the regulators. Also, multiple poppet type valves may be used for low pressure, high volume fluid flow regulation. The above prior art, however generally cannot accommodate high pressure, low volume fluid flow. This invention, on the other hand, is able to provide constant fluid flow in high or low pressure and high or low volume ranges.

The present invention is also different from the above sliding sleeve and multiple poppet type valves in that the piston of the valves of the prior art move relative to the valve body to vary fluid flow as the pressure changes, while the piston of the present invention does not move substantially relative to the valve body after fluid flow has stabilized. Instead, constant spring force on the piston in the present invention allows constant flow with changing pressure. The present invention thus experiences less wear and tear from moving parts.

Constant fluid flow regulators taught in prior art regulate fluid flow by adjustment screws that directly vary spring tension by attachment to the piston spring itself. Other regulators change fluid flow by altering piston position via springs and ball bearings located over the piston. The system employing springs and ball bearings is subject to extreme torque due to the fluid pressure in the chamber.

Additionally, U.S. Pat. No. 4,893,649 issued to Skoglund and U.S. Pat. No. 3,958,596 issued to Gerrard both disclose valves in which fluid flow variation is implemented by an adjustable valve seat. Adjustment of the valve seat adjusts the spring tension, which in turn alters the pressure differential across the piston. However, both of the above prior art patents employ threaded, screw-type mechanisms for adjusting the valve seat which are difficult to operate, have a narrow operating range, and are prone to breakage in high pressure environments.

Also, the screw-type valve seat adjustment mechanisms of the above prior art references both impede fluid flow through the valve. U.S. Pat. No. 4,893,649, discloses a valve in which the fluid outlet is oriented perpendicular to the fluid inlet in order to accommodate the valve seat adjustment mechanism. This angled fluid flow pathway results in a more complex valve design as well as increased fluid turbulence and higher pressure drops. U.S. Pat. No. 3,958,596 issued to Gerrard teaches a valve in which the fluid outlet passes axially through the valve seat adjustment screw. This valve seat adjustment mechanism configuration is difficult to use while the valve is in operation.

The valve of the present invention, on the other hand, employs a piston adjustment mechanism which does not require the valve outlet to be oriented at an angle from the valve inlet (the inlet and outlet instead may be axially aligned), which is not in the path of the outlet fluid flow, and which is hydraulically, as opposed to mechanically, operated.

Finally, other constant fluid flow regulators allow fluid flow around the piston periphery to constitute the principal channel of fluid passage through the regulator. In the high pressure, low flow embodiment of the present invention, the sole flow passage is a single orifice or group of orifices through the piston. This calibrated flow orifice, or orifices, allows precise measurement and calculation of prospective flow rates, unavailable in most of the prior art devices. The optional use of the sole flow path allows the valve to function at high pressure, unlike the prior art. Fluid flow around the piston periphery in the prior art prevents use in high pressure, low fluid flow environment.

SUMMARY OF THE INVENTION

The present invention provides a mechanism for automatically maintaining a uniform rate of fluid flow through a flow channel under varying pressures from fluid sources. In accordance with the present invention, a valve body has an inlet port and a single outlet port through the valve body and preferably axially aligned. A bore is located within the valve body. A piston is disposed within the bore and is biased with a spring or springs. The piston divides the bore into two chambers. The flow path through the valve mechanism is a preferably calibrated flow orifice which is off-set from the fluid inlet. Optionally, fluid may flow around the piston when used in low pressure systems; or high pressure high flow systems.

The piston is initially spring biased towards the top portion of the valve. Fluid flowing into the controller valve via the inlet port increases the pressure in the chamber above the piston, forcing the piston toward the valve seat. The piston is thus seated in the valve seat, blocking fluid flow to the outlet port. The pressure in the chamber below the piston builds until the pressure force in this lower chamber plus the piston spring force is greater than the pressure force in the chamber above the piston. The piston then lifts from the valve seat, and the pathway to the outlet orifice is opened. Fluid flows through the piston via the calibrated orifice. An equilibrium flow rate is reached (i.e., when the pressure forces in the upper chamber equals the pressure forces in the lower checker plus the spring force) by variation in the piston position based on the interaction of the above fluid pressure forces and spring force.

After the desired flow rate has been attained, the piston no longer moves substantially relative to the valve body. Instead, constant flow rate is maintained despite pressure changes because the spring force maintains a constant pressure differential pressure between the two valve chambers.

A pin slidably mounted in the piston is oriented to mate with the valve seat. An increase in the hydraulic pressure (from a pressure source) between the pin and the piston body results in repositioning of the piston body closer to the fluid inlet and farther from the valve seat, thus resulting in a decrease in the spring force. In turn, the pressure differential across the piston is decreased and fluid flow thus decreases. Conversely, a decrease in the hydraulic pressure between the pin and the piston body results in repositioning of the piston body farther from the fluid inlet and closer to the valve seat, thus resulting in an increase in the spring force. The pressure differential is thus increased, as is the fluid flow.

DESCRIPTION OF THE DRAWINGS

A more complete appreciation of the invention may be had by reference to the accompanying drawing illustrating a preferred embodiment of the invention to be described in detail, wherein:

The FIGURE is a cross-sectional view of a valve mechanism in accordance with the present invention.

DESCRIPTION OF THE PREFERRED EMBODIMENT

The novel features believed to be characteristic of this invention are set forth in the appended claims. The invention itself, however, may best be understood and its various objects and advantages best appreciated by reference to the detailed description below in connection with the accompanying drawings.

Referring to the FIGURE, the reference numeral 10 indicates the constant flow rate controller valve, as a whole. Valve 10 has a valve body 12 having at its top portion an inlet port 14, and having at its bottom portion an outlet port 16 which are preferably axially aligned. A bore 18 is formed within valve body 12; the bore 18 is defined by an elongated cylinder of decreased diameter at its lower portion.

A piston 20 having a head 21 is disposed within bore 18 such that a portion of bore 18 is divided into chamber 22 above piston head 21 and chamber 24 below piston 20. Piston 20 is of a generally cylindrical configuration. Chambers 22 and 24 may be sized to be of relatively small area to minimize the amount of "fluid packing" in the invention. "Fluid packing" relates to the amount of fluid in the valve. If less flow is present in the valve, fluid compressibility will not delay the response time of the valve to pressure fluctuations.

When the device is used in a high pressure, low volume environment (e.g., 5000 p.s.i. and 0.5 gallons per day), the sole flow path through the constant flow rate controller valve 10 is a flow path through the piston 20. No other paths are present, such as fluid flow around the periphery of piston 20, thus allowing the invention to operate in high pressure, low flow environments. However, for use in a low or high pressure, high flow environment (e.g. 20 p.s.i. and 100 gallons per minute), fluid flow around the periphery of piston 20 may occur. This flow path within piston 20 is an orifice 26 that permits the flow of fluid from chamber 22 through piston 20 and into chamber 24. Orifice 26 is off-set on piston head 21 such that orifice 26 is off-set from the longitudinal axis through piston 20. Thus, because orifice 26 is axially off-set from, and is not in alignment with, inlet port 14 and fluid flow through piston 20 and outlet port 16 ceases when piston 20 is urged against inlet port 14.

In order to prevent fluid flow around the periphery of piston 20 when this invention is employed in high fluid pressure environments, seal 28 is placed around the periphery of piston 20. Seal 28 is preferably a cup seal. Seal 28 is optional when the invention is used in a low pressure or high flow environment. When used in a low pressure environment, seal 28 may be a diaphragm seal.

Within chamber 24 are springs 30 which contact piston 20 and bias piston 20 upwardly toward chamber 22. Springs 30 may specifically be Bellville washer type springs, manufactured by Key Bellville, Inc., Box 1916, Leechburg, Pa. 15656, may be another washer type spring, or may be another type of spring, such as a coil type spring for example. By employing washer type springs for springs 30, the desired flow rate may be conveniently altered by stacking additional washer type springs to vary the spring force present in chamber 24 of the constant flow rate controller valve 10, thus changing the pressure differential across the piston.

Piston pin 32 is a relatively narrowed cylindrical structure located on the bottom portion of piston 20. The bore 18 forming chamber 22 and 24 is sized such that the diameter of bore 18 below chamber 24 (outlet port 16) is substantially narrower than the portions of bore 18 forming chambers 22 and 24. This narrowed portion of bore 18 (outlet port 16) is sized to accommodate piston pin 32 as piston 20 is forced toward valve seat 36 and outlet port 16 when the fluid pressure forces in chamber 22 is greater than the fluid pressure forces and the spring force in chamber 24.

Piston pin 32 is slidably mounted in piston 20. A hydraulic fluid conduit 38 in piston 20 communicates with the end of piston pin 32 in piston 20. Hydraulic fluid conduit 38 is connected to one end of hydraulic fluid line 40, which is preferably a flexible steel braided fluid hose. The opposite end of hydraulic fluid line 40 is attached to hydraulic fluid opening 42. Thus, hydraulic fluid from a pressure source well known in the art, such as a pump, enters hydraulic fluid opening 42, passes through hydraulic fluid line 40 and hydraulic fluid conduit 38 to apply pressure to the portion of piston 20 containing piston pin 32. A fluid tight seal is maintained around piston pin 20 by gaskets 44.

To decrease fluid flow, an increase in fluid pressure in the portion of hydraulic fluid conduit 38 between piston 20 and piston pin 32 results in piston 20 moving closer to inlet port 14 and farther from outlet port 16 in body 12, thus resulting in a decrease in the spring force of springs 30. In turn, the pressure differential across piston 20 ($\Delta P = P_1 - P_2$) is decreased and fluid flow (Q) thus decreases. To increase fluid flow, a decrease in fluid pressure in the portion of hydraulic fluid conduit 38 between piston 20 and piston pin 32 results in piston 20 moving farther from inlet port 14 and closer to outlet port 16 in body 12, thus resulting in an increase in the spring force of springs 30. The pressure differential across piston 20 is thus increased, as is the fluid flow (Q). Note that piston pin 32 does not move substantially with respect to valve body 12 during the above described movement of piston 20 to vary fluid flow.

While the above described embodiment uses a hydraulic mechanism to vary the relative position of piston 20 in valve body 12, it is apparent to one skilled in the art that mechanical and electro-mechanical mechanisms, for example, can also be employed.

The constant flow rate controller valve 10 operates based on the following force balance equations.

$$P_1 A_{piston} = P_2(A_{piston} - A_{pin}) + KX + P_3 A_{pin}$$

Where
  $P_1$ = pressure in chamber 22
  $A_{piston}$ = surface area of piston 20
  $P_2$ = pressure in chamber 24
  $KX$ = spring force of springs 30
  $A_{pin}$ = surface area of piston pin 32 which mates with seat 36
  $P_3$ = pressure at outlet port 16

Rearrangement of terms produces the following equations:

$$P_1 A_{piston} = P_2 A_{piston} - P_2 A_{pin} + KX + P_3 A_{pin}$$

$$(P_1 - P_2) A_{piston} = KX - P_2 A_{pin} + P_3 A_{pin}$$

$$\Delta P = P_1 - P_2 = \frac{KX - P_2 A_{pin} + P_3 A_{pin}}{A_{piston}}$$

Because $A_{pin}$ is small in comparison to $A_{piston}$, and assuming $P_3$ equals the flow pressure at outlet port 16, the following equations characterize the force balance existing in the present invention.

$$KX = (P_1 - P_2) A_{piston} + P_2 A_{pin} - P_3 A_{pin}$$

($P_2 A_{pin}$ and $P_3 A_{pin}$ being relatively small in size)

$$KX = (P_1 - P_2) A_{piston}$$

Thus, the differential pressure $(P_1 - P_2)$ is a function of spring force (KX).

The flow rate of water, for example, through the constant flow rate controller valve 10 is defined by the following equation:

$$Q = Cv \sqrt{\Delta P / sg}$$

Where
$\Delta P = P_1 - P_2$
Q = flow rate
$P_1$ = pressure in chamber 22
$P_2$ = pressure in chamber 24
Cv = flow resistance across orifice 26
Sg = Specific gravity of fluid Note that because differential pressures $(P_1 - P_2)$ is a function of spring force (KX), flow rate (Q) is also a function of spring force. Thus, the constant flow rate controller valve 10 has a constant flow as long as spring force remains constant. This flow is constant regardless of the flow pressure at inlet port 14. Theoretically, there is a pressure force exerted on the piston pin 32 which mates with seat 36 and against the remainder of piston 20 defined by $$P_3 \cdot A_{pin}$$

Where
$P_3$ = pressure at outlet port 16
$A_{pin}$ surface area of piston pin 32

However, the above force is small due to the small surface are of piston pin 32 when compared to the surface area of piston 20 as a whole. Thus, flow rate is relatively constant regardless of the flow pressure at outlet port 16. Note that this force would not be small and the flow rate would not be constant if, in the present invention, the area of piston pin 32 was not small in value when compared to the surface area of piston 20 as a whole.

The constant flow rate controller valve 10 operates as follows. Fluid passes through inlet port 14 and enters chamber 22. Piston 20, which is biased by springs 30 towards chamber 22, is pushed toward chamber 24 by the increased pressure in chamber 22, thus seating piston pin 32 in valve seat 36. The seating of piston pin 32 in valve seat 36 blocks flow to outlet port 16. Chamber 24 is thus sealed.

Fluid flows from chamber 22 into chamber 24 via orifice 26, and the flow pressure force in chamber 24 increases. When the flow pressure forces in chamber 24 plus the spring force of spring 30 exceeds forces caused by the pressure in chamber 22, piston 20 is pushed towards chamber 22 and is unseated from valve seat 36 and fluid flow begins. A piston equilibrium position is next attained when the forces on the piston in chamber 22 equals the forces on the piston (which includes the spring force on spring 30) in chamber 24.

The above piston equilibrium position also provides the desired flow rate, the desired flow rate being set by hydraulically adjusting the position of valve seat 36. Without further substantial change in the position of piston 20, the flow rate will remain constant despite flow pressure changes because the spring force of springs 30 maintains a constant pressure differential between chamber 22 and chamber 24.

While particular embodiments of the present invention have been described in some detail above, changes and modifications may be made in the illustrated embodiments without departing from the form or spirit of the invention. It is therefore intended that following claims cover all equivalent modifications and variations as fall within the scope of the invention as defined by the claims.

I claim:
1. A valve;
    a housing having an inlet and an outlet forming a flow passage through said housing;
    a piston mounted in a bore in said flow passage, said piston dividing said bore into first and second chambers respectively communicating with said inlet and said outlet;
    an orifice providing fluid flow from said inlet to said outlet;
    spring means biasing said piston toward said inlet, said spring means providing a bias force that establishes a substantially constant pressure differential between said first chamber and said second chamber to enable substantially constant outlet flow at varied pressures;
    a valve seat in between said piston and said outlet;
    a pin slidably mounted in said piston, said pin aligned to seat and unseat with said valve seat; and
    means for altering the position of said piston in said bore and with respect to said pin to adjust the fluid flow rate wherein said means for altering the position of said piston in said bore includes means for applying fluid pressure between said piston and said pin.

2. The valve of claim 1 wherein said means for altering the position of said piston in said bore is comprised of:
    a fluid conduit between said piston and said pin; and
    a fluid line communicating with said fluid conduit and with a fluid opening in said housing.

3. The valve of claim 2 wherein said means for altering the position of said piston in said bore is further comprised of:
    a fluid pressure source communicating with said fluid line through said fluid opening.

4. The valve of claim 2 wherein said fluid conduit opens into said second chamber and said fluid line is located in said second chamber.

5. The valve of claim 1 wherein said orifice is axially off-set from said inlet.

6. The valve of claim 1 wherein said inlet and said outlet are axially aligned.

7. A valve for regulating fluid flow comprising:
a housing having an inlet and an outlet forming a flow passage through said housing;
a piston mounted in a bore in said flow passage, said piston dividing said bore into first and second chambers respectively communicating with said inlet and said outlet;
an orifice through said piston for fluid flow from said inlet to said outlet;
spring means biasing said piston toward said inlet, said spring means providing a bias force that establishes a substantially constant pressure differential between said first chamber and said second chamber to enable substantially constant outlet flow at varied pressures;
a valve seat in between said piston and said outlet;
a pin slidably mounted in said piston, said pin aligned to seat and unseat with said valve seat; and
means for altering the position of said piston in said bore and with respect to said pin to adjust the fluid flow rate, said means for altering the position of said piston including means for applying fluid pressure between said piston and said pin.

8. The valve of claim 7 wherein said means for altering the position of said piston in said bore is comprised of:
a fluid conduit between said piston and said pin; and
a fluid line communicating with said fluid conduit and with a fluid opening in said housing.

9. The valve of claim 8 wherein said means for altering the position of said piston in said bore is further comprised of:
a fluid pressure source communicating with said fluid line through said fluid opening.

10. The valve of claim 8 wherein said fluid conduit opens into said second chamber and said fluid line is located in said second chamber.

11. The valve of claim 7 wherein said orifice is axially off-set from said inlet.

12. The valve of claim 7 wherein said inlet and said outlet are axially aligned.

13. A valve for regulating fluid flow comprising:
a housing having an inlet and an outlet forming a flow passage through said housing;
a piston mounted in a bore in said flow passage, said piston dividing said bore into first and second chambers respectively communicating with said inlet and said outlet;
an orifice providing fluid flow from said inlet to said outlet;
spring means biasing said piston toward said inlet, said spring means providing a bias force that establishes a substantially constant pressure differential between said first chamber and said second chamber to enable substantially constant outlet flow at varied pressures;
a valve seat in between said piston and said outlet;
a pin slidably mounted in said piston, said pin aligned to seat and unseat with said valve seat; and
means for altering the position of said piston in said bore and with respect to said pin to adjust the fluid flow rate, said means for altering the position of said piston including a fluid conduit between said piston and said pin and a fluid line communicating with said fluid conduit and with a fluid opening in said housing.

14. The valve of claim 13 wherein said means for altering the position of said piston in said bore is further comprised of:
a fluid pressure source communicating with said fluid line through said fluid opening.

15. The valve of claim 13 wherein said fluid conduit opens into said second chamber and said fluid line is located in said second chamber.

16. The valve of claim 13 wherein said orifice is axially off-set from said inlet.

17. The valve of claim 13 wherein said inlet and said outlet are axially aligned.

* * * * *